(12) United States Patent
Van Rotterdam (10) Patent No.: US 10,922,375 B2
(45) Date of Patent: Feb. 16, 2021

(54) FILE PORTABILITY ACROSS SAAS APPLICATIONS

(71) Applicant: CITRIX SYSTEMS, INC., Fort Lauderdale, FL (US)

(72) Inventor: Jeroen Mattijs Van Rotterdam, Fort Lauderdale, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

(21) Appl. No.: 16/266,195

(22) Filed: Feb. 4, 2019

(65) Prior Publication Data

US 2020/0250253 A1  Aug. 6, 2020

(51) Int. Cl.
  *G06F 15/16* (2006.01)
  *G06F 16/957* (2019.01)
  *G06F 9/451* (2018.01)
  *G06F 21/60* (2013.01)
  *H04L 29/08* (2006.01)

(52) U.S. Cl.
  CPC .......... *G06F 16/9574* (2019.01); *G06F 9/451* (2018.02); *G06F 21/602* (2013.01); *H04L 67/06* (2013.01)

(58) Field of Classification Search
  CPC .... G06F 16/9574; G06F 9/451; G06F 21/602; H04L 67/06
  See application file for complete search history.

(56) References Cited

U.S. PATENT DOCUMENTS

| | | | | |
|---|---|---|---|---|
| 6,356,863 B1* | 3/2002 | Sayle | ................... | G06F 16/192 703/27 |
| 7,519,910 B2* | 4/2009 | Saka | ....................... | H04L 29/06 715/733 |
| 8,020,101 B2* | 9/2011 | Kesavarapu | ............ | G06F 9/543 715/724 |
| 9,032,081 B1* | 5/2015 | North | .................. | H04L 67/1006 709/227 |
| 9,176,744 B2 | 11/2015 | Lee | | |
| 9,538,345 B2 | 1/2017 | Sah et al. | | |
| 2003/0005144 A1* | 1/2003 | Engel | ...................... | H04L 47/21 709/235 |
| 2006/0190835 A1* | 8/2006 | Cunningham | ........ | G06F 40/166 715/770 |
| 2007/0038688 A1* | 2/2007 | Morrill | ............... | G06F 16/1844 |
| 2012/0265892 A1* | 10/2012 | Ma | ..................... | H04N 21/6125 709/231 |

(Continued)

FOREIGN PATENT DOCUMENTS

EP  2131271  9/2009

*Primary Examiner* — Jonathan A Bui
(74) *Attorney, Agent, or Firm* — Allen, Dyer, Doppelt + Gilchrist, PA (57) ABSTRACT

A client computing device includes an embedded browser that includes first and second browsers, a copy file user interface (UI) control and a processor. The first browser is for a user to identify a file to be copied from a source application, and the second browser is for the user to identify a location of where the file is to be copied within a target application. The processor cooperates with the embedded browser in response to the user selecting the copy file UI control to retrieve the identified file in the source application and copy to the identified location within the target application without requiring further user input.

20 Claims, 5 Drawing Sheets

(56) References Cited

U.S. PATENT DOCUMENTS

| | | | |
|---|---|---|---|
| 2013/0110974 A1* | 5/2013 | Arrasvuori | G06F 16/176 709/217 |
| 2014/0006465 A1* | 1/2014 | Davis | G06F 16/183 707/827 |
| 2015/0052593 A1 | 2/2015 | Guo et al. | |
| 2016/0112507 A1* | 4/2016 | Serpico | G06F 3/033 709/205 |
| 2016/0216903 A1* | 7/2016 | Joshi | G06F 3/0619 |
| 2016/0294839 A1* | 10/2016 | Walline | G06F 3/0481 |
| 2018/0074843 A1* | 3/2018 | Smith | G06F 9/45558 |
| 2019/0327135 A1* | 10/2019 | Johnson | H04L 67/34 |

\* cited by examiner

FILE PORTABILITY ACROSS SAAS APPLICATIONS

TECHNICAL FIELD

The present disclosure relates to computer applications, and more particularly, to copying a file from one Software as a Service (SaaS) application to a different SaaS application.

BACKGROUND

Software as a Service (SaaS) is a computing approach to software delivery by which applications are centrally hosted on one or more third-party servers (e.g., in the cloud) and are typically provided on a subscription basis to users. SaaS applications are offered for numerous areas, including business, accounting, and even gaming applications.

SaaS applications are typically accessed on client computing devices via an internet browser. In many cases a user may have a file in a particular SaaS application and needs to upload this file to a different SaaS application. Traditionally, the user will download the file from one SaaS application to the local file system, locate the file on the file system, then switch to the second SaaS application and upload the file. This is a time consuming process for the user, which can lead to data loss or exposure since the file is now copied to the local file system.

SUMMARY

A client computing device includes an embedded browser that includes first and second browsers, a copy file user interface (UI) control and a processor. The first browser is for a user to identify a file to be copied from a source application, and the second browser is for the user to identify a location of where the file is to be copied within a target application. The processor is configured to cooperate with the embedded browser in response to the user selecting the copy file UI control to retrieve the identified file in the source application, and copy to the identified location within the target application without requiring further user input.

The client computing device is advantageously configured to create a file tunnel between source and target servers so that identified files can be streamed therebetween. Traditionally, uploading a file from the source server to the target server is a time consuming process. This process is improved based on user selection of the copy file user interface (UI) control to initiate the streaming without requiring further user input for copying the identified file. In addition, this process avoids data loss or exposure since the files are not copied to a local file system within the client computing device.

The client computing device further includes a cache memory, and the processor is configured to download the file from the source application to the cache memory, and upload the file from the cache memory to the identified location within the target application.

The uploading of the file begins before downloading of the file is completed. The file is streamed from the source application to the target application via the cache memory.

The processor is further configured to delete the file in the cache memory after being uploaded to the identified location within the target application. The processor may be further configured to encrypt the file in the cache memory.

The copy file UI control is configured as a hot key. The functionality of the copy file UI control is specific to a first type source application, and specific to a second type target application that is different from the first type source application. The source application may be a first type of Software as a Service (SaaS) application, and the target application may be a second type SaaS application.

Another aspect is directed to a method for operating a client computing device comprising an embedded browser that includes first and second browsers, a copy file user interface (UI) control and a processor. The method includes operating the first browser based on user input to identify a file to be copied from a source application, and operating the second browser based on user input to identify a location of where the file is to be copied within a target application. The processor cooperates with the embedded browser in response to user input selecting the copy file UI control to retrieve the identified file in the source application, and copy to the identified location within the target application without requiring further user input.

Yet another aspect is directed to a non-transitory computer readable medium for operating a client computing device comprising an embedded browser that includes first and second browsers, a copy file user interface (UI) control and a processor, and with the non-transitory computer readable medium having a plurality of computer executable instructions for causing the client computing device to perform steps as described above.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

As will be discussed below, a client computing device defines a file tunnel between source and target web servers so that identified files can be streamed therebetween. Traditionally, uploading a file from the source web server to the target web server is a time consuming process. This process is improved based on user selection of a copy file user interface (UI) control (e.g., a hot key) to initiate the streaming without requiring further user input for copying the identified file.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Figure 1:
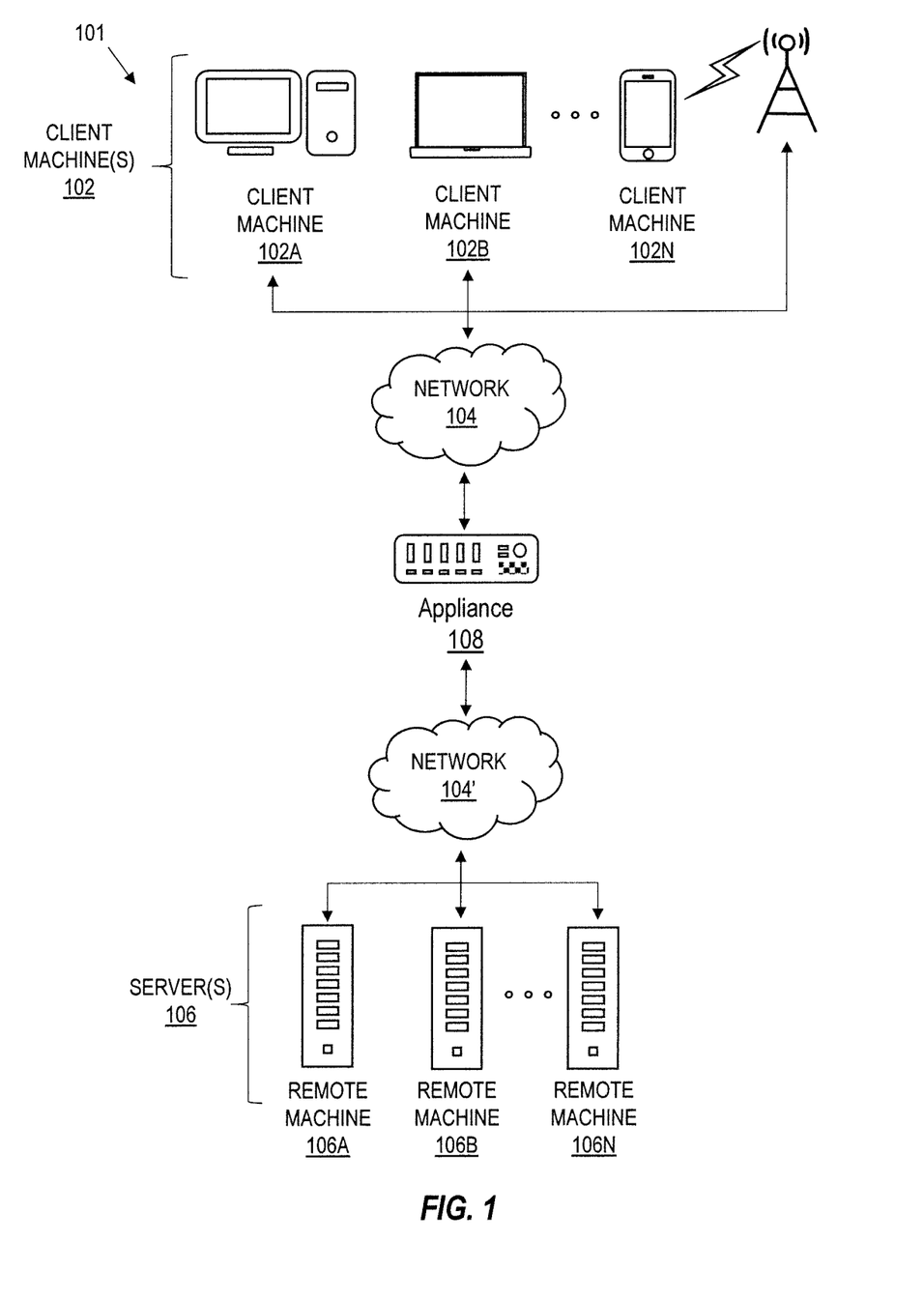
FIG. 1 is a block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation client or other client or program that uses a thin-client or a remote-display protocol to capture display output generated by an application executing on a server 106 and transmits the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a WLAN, the protocols may include 802.11, Bluetooth, and Near Field Communication (NFC).

Figure 2:
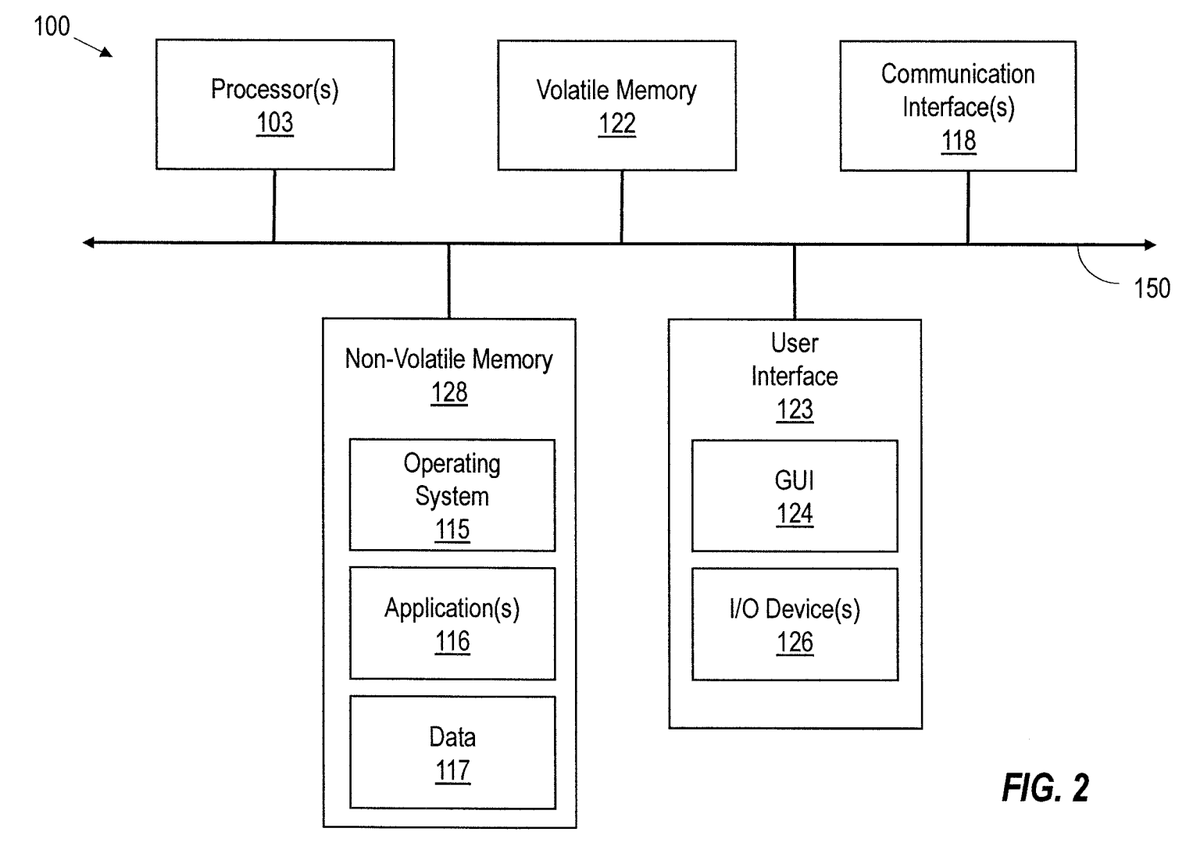
FIG. 2 is a block diagram of a computing device useful for practicing an embodiment of the client machines or the remote machines illustrated in FIG. 1.

FIG. 2 depicts a block diagram of a computing device 100 useful for practicing an embodiment of client devices 102 or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid state storage media; one or more hybrid magnetic and solid state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor may be analog, digital or mixed-signal. In some embodiments, the processor may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3:
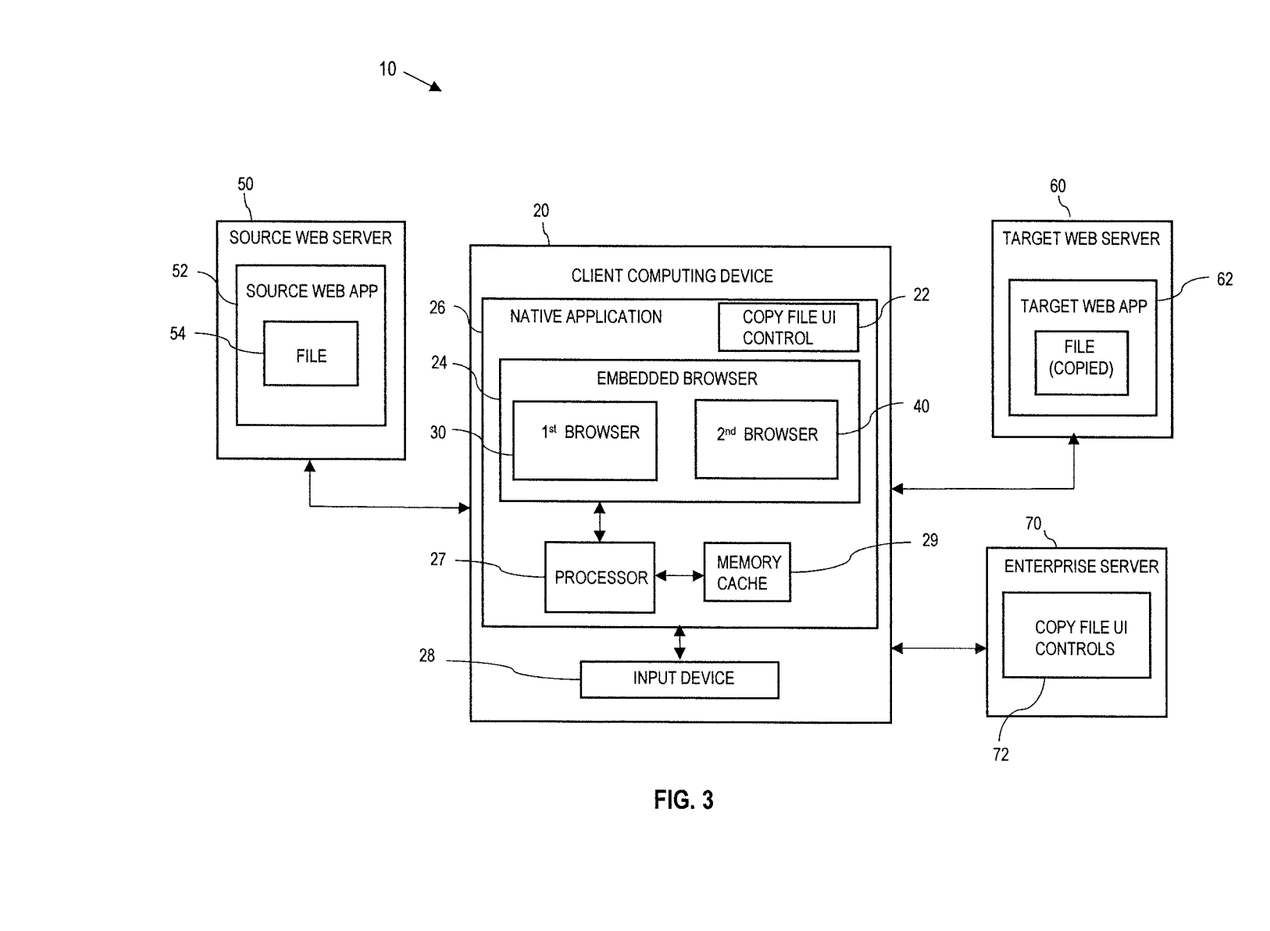
FIG. 3 is a block diagram of a computing system that includes a client computing device with a copy file UI control in which various aspects of the disclosure may be implemented.

Referring initially to FIG. 3, a computing system 10 includes a client computing device 20 that is configured to create a file tunnel between source and target web servers 50, 60 so that identified files 54 can be streamed therebetween. Traditionally, uploading a file from the source web server 50 to the target web server 60 is a time consuming process.

As will be discussed in detail below, this process is improved based on user selection of a copy file user interface (UI) control 22 to initiate the streaming without requiring further user input for copying the identified file 54. In addition, this process avoids data loss or exposure since the files 54 are not copied to a local file system within the client computing device 20. As such, the systems and methods set forth herein advantageously provide improved performance within a virtualized and/or enterprise computing environment.

The source web server 50 provides a source web application 52 that includes a file 54 to be copied. The target web server 60 provides a target web application 62 that is to receive a copy of the file 54 via the client computing device 20. The source and target web applications 52, 62 may be Software as a Service (SaaS) applications, for example.

The client computing device 20 includes an embedded browser 24 that includes a first browser 30 for the user to identify the file 52 to be copied from the source web application 52, and a second browser 40 for the user to identify a location of where the file 52 is to be copied within the target web application 62.

The client computing device 20 includes a copy file UI control 22. The copy file UI control 22 may be in the form of a hot key or a drop down menu selection, for example. Since the copy file UI control 22 is configured as a hot key, it is used to trigger a sequence of repetitive actions with a single user input, as readily appreciated by those skilled in the art.

A processor 27 is configured to cooperate with the embedded browser 24 in response to the user selecting the copy file UI control 22 to retrieve the identified file 54 in the source web application 52, and copy to the identified location within the target web application 62 without requiring further user input.

The embedded browser 24 is a browser embedded within a native application 26. For example, Citrix Receiver and Citrix Workspace App are native applications that may be installed on the client computing devices 20.

The client computing device 20 includes an input device 28. The input device 28 may be a keyboard or a pointing device, for example. Prior to the user selecting the copy file UI control 22, the user operates the first browser 30 via the input device 28 to identify the file 54 to be copied from the source web application 50, and operates the second browser 40 to identify a location of where the file 54 is to be copied within a target web application 60.

When the user is ready to copy the file 54, the user selects the copy file UI command 22. Since the embedded browser 22 is embedded within the native application 26, this allows selection of the copy file UI command 22 to initiate copying of the file from the source web application 52 to the target web application 62 without requiring further user input.

For discussion purposes, the source web application 52 within the source web server 50 is SalesForce. SalesForce is a customer relationship management (CRM) application provided by SalesForce.com, Inc. and is focused on sales and support. The file 54 to be copied is a sales contract, for example. The target web application 62 within the target web server 60 is Ariba. Ariba is provided by SAP Ariba and is focused on the procurement process. In this example, a copy of the sales contract is to be provided from SalesForce to Ariba.

Since the copy file UI control 22 is configured as a hot key, it is used to trigger a sequence of repetitive actions to be performed by the processor 27 with a single user input. The functionality of the copy file UI control 22 is specific to a first type source web application 52, and specific to a second type target web application 62 that is different from the first type source web application 52. In the illustrated example, the copy file UI control 22 is configured to interface between SalesForce and Ariba.

The illustrated copy file UI control 22 is limited to copying a file 54 between SalesForce and Ariba. If the sales contract was to be copied to a web application other than Ariba, then a different copy file UI control 22 would be needed.

Consequently, the client computing device 20 will typically have a plurality of copy file UI controls 22. Each copy file UI control 22 would be directed to facilitating the copying of a file between two particular web applications.

The copy file UI controls 22 may be provided to the client computing device from an enterprise server 70. In this case, the client computing device 20 is enrolled with the enterprise server 70. Even though only one client computing device 20 is illustrated as being enrolled with the enterprise server 70, there is no limit to the number of devices that may be enrolled.

An administrator of the enterprise server 70 defines the functionality that each respective copy file UI control 22 is to initiate. The different copy file UI controls 22 are then provided from the enterprise server 70 to the client computing device 20. The user of the client computing device 20 would then select the appropriate copy file UI control 22 depending on the particular source and target web application types being accessed.

The client computing device 20 further includes a cache memory 29. In response to the user selecting the copy file UI control 22, the processor 27 downloads the file 54 from the source web application 52 to the cache memory 29, and then uploads the file 54 from the cache memory 29 to the identified location within the target web application 62.

The file 54 is streamed from the source web application 52 to the target web application 62 via the cache memory 29. Uploading of the file 54 may begin before downloading of the file to the cache memory 29 is completed to speed up the copying.

The file in the cache memory 29 may be encrypted. The processor 27 is configured to delete the file 54 in the cache memory 29 after being uploaded to the identified location within the target web application 62. This avoids data loss or exposure since the file 54 is not copied to a local file system within the client computing device 20.

Figure 4:
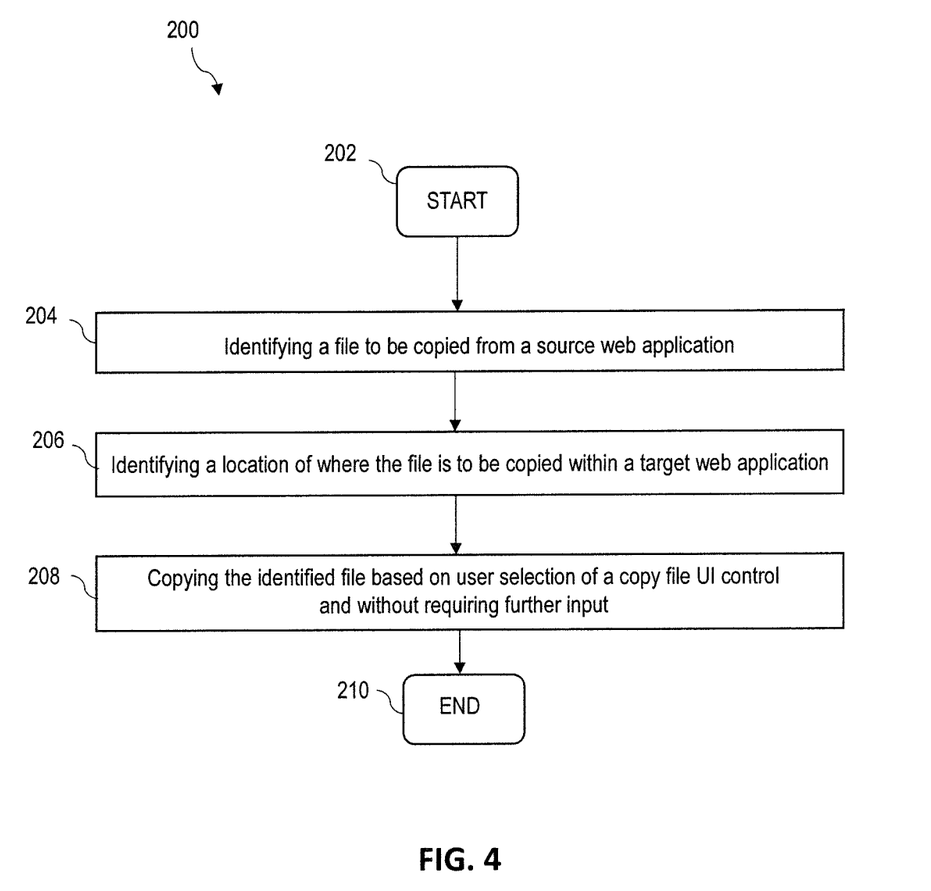
FIG. 4 is a general flowchart illustrating a method for operating the client computing device illustrated in FIG. 3.

Referring now to the flowchart 200 in FIG. 4, and generally speaking, a method for operating a client computing device will be discussed. From the start (Block 202), the method includes identifying a file 54 to be copied from a source web application 52 at Block 204, and identifying a location of where the file 54 is to be copied within a target web application 62 at Block 206. The identified file 54 in the source web application 52 is copied to the identified location within the target web application 62 based user selection of a copy file UI control 22 and without requiring further user input at Block 208. The method ends at Block 210.

Figure 5:
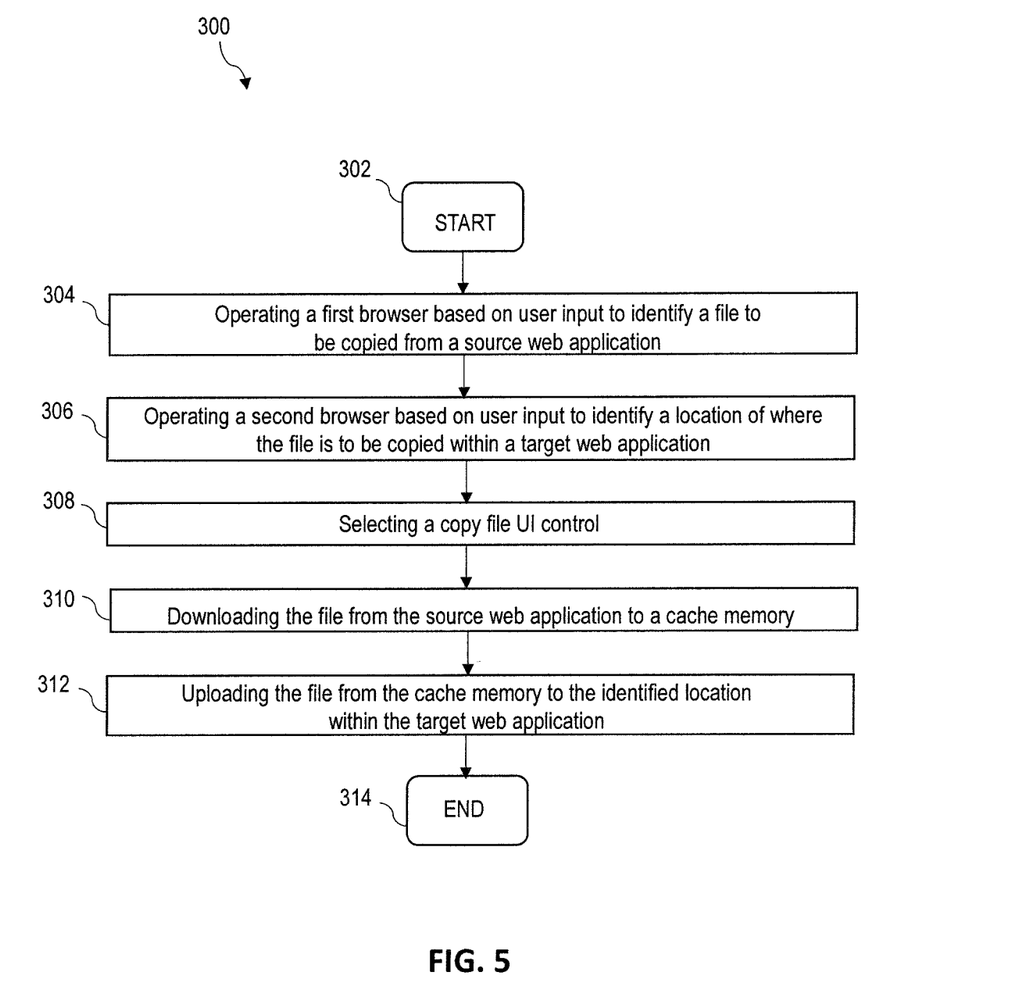
FIG. 5 is a more detailed flowchart illustrating a method for operating the client computing device illustrated in FIG. 3.

Referring now to the flowchart 300 in FIG. 5, more detailed steps for operating the client computing device 20 will be discussed. From the start (Block 302), the method includes operating a first browser 30 based on user input to identify a file 54 to be copied from a source web application 52 at Block 304, and operating a second browser 40 based on user input to identify a location of where the file 54 is to be copied within a target web application 62 at Block 306. A copy file UI control 22 is selected by the user at Block 308. The file 54 is downloaded from the source web application 52 to the cache memory 29 at Block 310, and then uploaded from the cache memory 29 to the identified location within the target web application 62 at Block 312. The method ends at Block 314.

Another aspect is directed to a non-transitory computer readable medium for operating a client computing device 20 comprising an embedded browser 24 that includes first and second browsers 30 and 40, a copy file user interface (UI) control 22 and a processor 27. The non-transitory computer readable medium has a plurality of computer executable instructions for causing the client computing device 20 to operate the first browser 30 based on user input to identify a file 54 to be copied from a source web application 52, and operating the second browser 40 based on user input to identify a location of where the file 54 is to be copied within a target web application 62. The processor 27 is operated to cooperate with the embedded browser 24 in response to user input selecting the copy file UI control 22 so as to retrieve the identified file 54 in the source web application 52 and copy to the identified location within the target web application 62 without requiring further user input.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed:

1. A client computing device comprising:
an embedded browser including a first browser for a user to identify a file to be copied from a source application at a source web server, and a second browser for the user to identify a location of where the file is to be copied within a target application at a target web server;
a plurality of copy file user interface (UI) controls, wherein functionality of each copy file UI control is specific to a source application type and specific to a target application type that is different from the source application type; and
a processor configured to cooperate with said embedded browser in response to the user selecting an appropriate copy file UI control having the correct functionality to retrieve the identified file in the source application, and copy to the identified location within the target application without requiring further user input.

2. The client computing device according to claim 1 further comprising a cache memory, and wherein said processor is configured to perform the following:
download the file from the source application to said cache memory; and
upload the file from said cache memory to the identified location within the target application.

3. The client computing device according to claim 2 wherein uploading of the file begins before downloading of the file is completed.

4. The client computing device according to claim 2 wherein the file is streamed from the source application to the target application via said cache memory.

5. The client computing device according to claim 2 wherein said processor is further configured to delete the file in said cache memory after being uploaded to the identified location within the target application.

6. The client computing device according to claim 2 wherein said processor is further configured to encrypt the file in said cache memory.

7. The client computing device according to claim 1 wherein said copy file UI control is configured as a hot key.

8. The client computing device according to claim 1 wherein functionality of said copy file UI control is specific to a first type source application, and specific to a second type target application that is different from the first type source application.

9. The client computing device according to claim 1 wherein functionality of said copy file UI control is provided by an enterprise server communicating with the client computing device.

10. The client computing device according to claim 1 wherein the source application comprises a first type of Software as a Service (SaaS) application, and the target application comprises a second type SaaS application.

11. A method for operating a client computing device comprising an embedded browser that includes first and second browsers, a plurality of copy file user interface (UI) controls and a processor, with functionality of each copy file UI control being specific to a source application type and specific to a target application type that is different from the source application type, the method comprising:
operating the first browser based on user input to identify a file to be copied from a source application at a source web server;
operating the second browser based on user input to identify a location of where the file is to be copied within a target application at a target web server; and
operating the processor to cooperate with the embedded browser in response to user input selecting an appropriate copy file UI control having the correct functionality to retrieve the identified file in the source application, and copy to the identified location within the target application without requiring further user input.

12. The method according to claim 11 wherein the client computing device further comprises a cache memory, and wherein operating the processor comprises the following:
downloading the file from the source application to the cache memory; and
uploading the file from the cache memory to the identified location within the target application.

13. The client computing device according to claim 12 wherein uploading of the file begins before downloading of the file is completed.

14. The method according to claim 12 wherein the file is streamed from the source application to the target application via the cache memory.

15. The method according to claim 12 further comprising deleting the file in the cache memory after being uploaded to the identified location within the target application.

16. The method according to claim 11 wherein the copy file UI control is configured as a hot key.

17. The method according to claim 11 wherein functionality of the copy file UI control is specific to a first type source application, and specific to a second type target application that is different from the first type source application.

18. A non-transitory computer readable medium for operating a client computing device comprising an embedded browser that includes first and second browsers, a plurality of copy file user interface (UI) controls and a processor, with functionality of each copy file UI control being specific to a source application type and specific to a target application type that is different from the source application type, and with the non-transitory computer readable medium having a plurality of computer executable instructions for causing the client computing device to perform steps comprising:
operating the first browser based on user input to identify a file to be copied from a source application at a source web server;
operating the second browser based on user input to identify a location of where the file is to be copied within a target application at a target web server; and
operating the processor to cooperate with the embedded browser in response to user input selecting an appropriate copy file UI control having the correct functionality to retrieve the identified file in the source application, and copy to the identified location within the target application without requiring further user input.

19. The non-transitory computer readable medium according to claim 18 wherein the client computing device further comprises a cache memory, and wherein operating the processor comprises the following:
downloading the file from the source application to the cache memory; and
uploading the file from the cache memory to the identified location within the target application.

20. The non-transitory computer readable medium according to claim 19 further comprising deleting the file in the cache memory after being uploaded to the identified location within the target application.

* * * * *